UNITED STATES PATENT OFFICE.

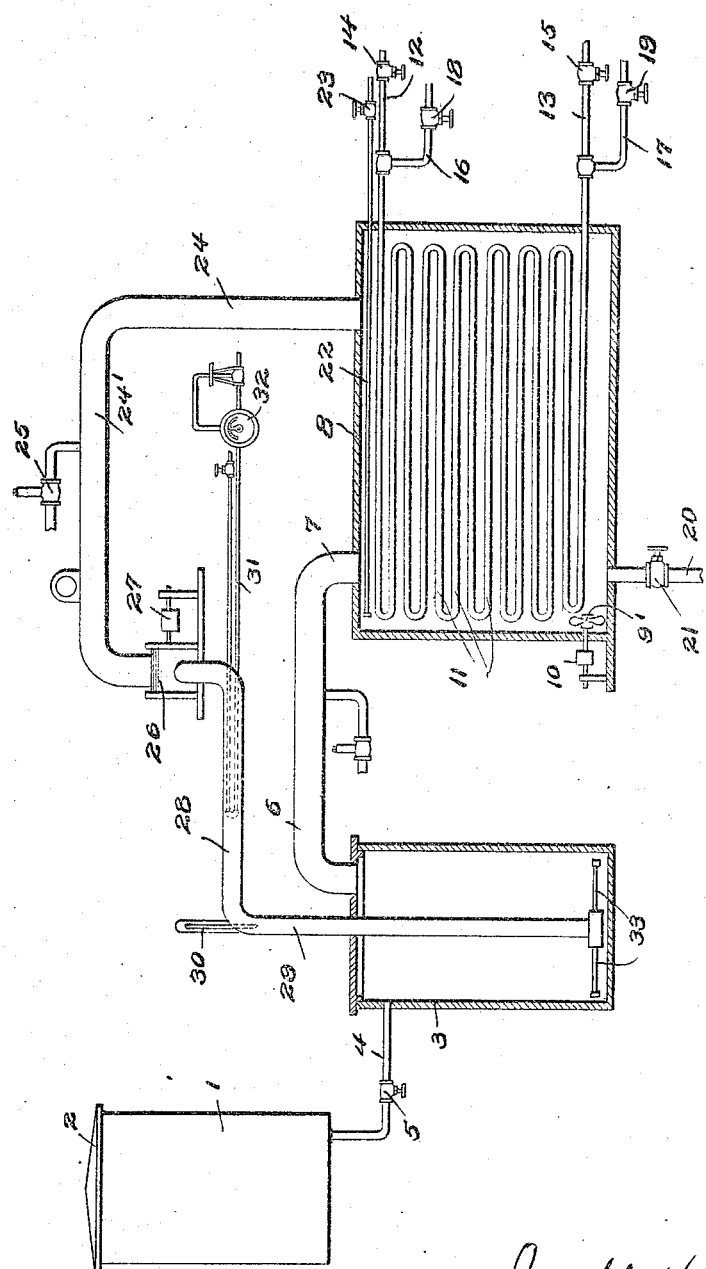

JOSEPH HUDSON MASON, OF PRINCE RUPERT, BRITISH COLUMBIA, CANADA.

APPARATUS FOR EVAPORATING MILK.

1,254,423.  Specification of Letters Patent.  Patented Jan. 22, 1918.

Application filed August 2, 1916. Serial No. 112,679.

*To all whom it may concern:*

Be it known that I, JOSEPH H. MASON, a citizen of the United States, residing at Prince Rupert, in the Province of British Columbia, Canada, have invented certain new and useful Improvements in Apparatus for Evaporating Milk, of which the following is a specification.

My invention relates to new and useful improvements in an apparatus for evaporating milk.

The object of the invention is to provide an evaporator of this character which will thoroughly evaporate the milk without heating, cooking by steam or other means.

Another object of my invention is to provide an evaporator of this character in which the operation may be continuous and having certain details of construction and combination of parts hereinafter more fully pointed out.

The accompanying drawing represents a side elevation of an evaporator of my invention, partly in cross section.

Referring now to the drawings, 1 represents a milk reservoir having its upper end closed by a cover 2, so that the milk may be readily poured therein. Below the milk reservoir 1 is a milk evaporating tank or receiver 3, which has a pipe 4 communicating with its upper end and is also in communication with the lower end of the milk reservoir and by means of which the evaporating chamber may be supplied with milk. The pipe 4, intermediate the reservoir and evaporating chamber, is provided with a valve 5, by means of which the supply of milk may be cut off, as will be hereinafter more fully described.

The evaporating chamber 3 has communicating with its upper end an enlarged air conveyer pipe 6 the end of which at 7 communicates with the insulated refrigerating chamber 8. The air conveyer pipe 6 may be provided with an air intake valve, so that a proper amount of air may be taken in owing to the cooling of the air which takes place in the insulated chamber 8. The chamber 8 is provided with a fan 9' driven by the pulley 10, which causes a thorough circulation of the moisture laden air over the refrigerating coils 11. The coils 11 have both ends 12 and 13 extending through the insulated chamber and supplied with brine for cooling the chamber 8. These ends 12 and 13 are provided with valves 14 and 15, so that the brine may be cut off from the coils and also have connected thereto, on the inside of the valves 14 and 15, the steam pipes 16 and 17 and provided with valves 18 and 19, so that either steam or brine may be passed into the coil 11, the purpose of which will be later described.

The insulated chamber is provided with a drain pipe 20 having a cock 21. Extending across the upper end of the chamber 8 above the coil is a hot water pipe 22 which has openings in its lower face, so that hot water is sprayed from the coil for washing the frost from the same. The pipe 22 on the outside of the chamber is provided with a valve 23 for controlling the supply of hot water thereto.

The upper end of the insulated chamber, adjacent the opposite side from the pipe 7, is provided with an air conveying pipe 24 which extends upwardly and has a horizontal portion 24' provided with an air relief valve 25 and also a hygrometer to measure the moisture contained in the air. The pipe 24' is turned downwardly and is connected to the rotary air pump 26 driven by the pulley 27 and forces the air into the horizontal air conveyer pipe 28 which has a downwardly extending portion 29 that extends into the evaporating chamber 3 adjacent its lower end. The pipe 28 has a thermometer 30 in a casing communicating therewith, so that the temperature of the air in the pipe 29 as it enters the evaporating chamber may be readily seen.

The horizontal air conveyer pipe 28 is provided with a steam pipe 31 which has one end connected to the automatic temperature regulator 32, so that the temperature of the pipe 31 may be kept at the predetermined temperature. The lower end of the air conveyer pipe 29 has connected thereto radially arranged small pipes 33 provided with openings so as to allow the air to pass into the milk contained in the evaporating chamber.

The operation of my apparatus is as follows: The coil is filled with brine and the rotary pump is started so as to draw the air from the insulated chamber and force it into the evaporating chamber. Any moisture in the air as it strikes the coil 11 will be condensed and form frost upon the coil. It then passes to the pipe 24 and through the pipe 29 to the evaporating chamber 3. After the moisture has been removed from the air, the valve 5 is opened and milk admitted to the evaporating chamber. The dry air passes from the pipe 33 up through the milk and absorbs the moisture and conveys it to the coil 11 where it is condensed into a frost and passes back to the pipe 29. Before entering the pipe 29 the air is relieved of its extreme cold by the steam pipe 31. The relief valve allows the air to be discharged and admitted to the air conveyer owing to the different temperatures as will be readily understood. This circulation takes place until the milk is condensed, when it is removed. The two insulated chambers are provided so that one can be used while the other is being cleaned. When the coils 11 have become heavily coated with frost the valves 14 and 15 are closed and steam is admitted through the pipes 16 and 17 which thaws the frost. At the same time, the valve 23 is opened allowing hot water to be sprayed upon the coil to further aid in thawing the frost. The water is drawn from the insulated chamber by opening the valve 21 of the drain 20. After this operation, brine is again passed into the coil and the evaporating operation again started in the same way.

Having thus described my invention, what I claim as new and desire to be secured by Letters Patent, is:

1. In a milk evaporator, the combination with an evaporating reservoir, of a drying chamber, a pipe for conducting air from the drying chamber to the evaporating reservoir and a return pipe to the drying chamber, a refrigerating brine coil in the drying chamber for congealing the moisture from the air and dehydrating same, and means for passing heat through said coil when out of operative relation with said evaporating reservoir.

2. In a milk evaporator, the combination with an evaporating reservoir, of a drying chamber, a pipe for conducting air from the drying chamber to the evaporating reservoir and a return pipe to the drying chamber, a refrigerating brine coil in the drying chamber for congealing the moisture from the air and dehydrating the air, and a water spray above said coil for removing the congealed moisture therefrom.

In testimony whereof I affix my signature.

JOSEPH HUDSON MASON.